US010291855B2

(12) United States Patent
Cabral et al.

(10) Patent No.: US 10,291,855 B2
(45) Date of Patent: May 14, 2019

(54) THREE-DIMENSIONAL, 360-DEGREE VIRTUAL REALITY CAMERA LIVE PREVIEW

(71) Applicant: Facebook, Inc., Menlo Park, CA (US)

(72) Inventors: Brian Keith Cabral, San Jose, CA (US); Mateusz Berezecki, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/851,565

(22) Filed: Dec. 21, 2017

(65) Prior Publication Data

US 2018/0302569 A1   Oct. 18, 2018

Related U.S. Application Data

(60) Provisional application No. 62/485,480, filed on Apr. 14, 2017.

(51) Int. Cl.
*H04N 5/232* (2006.01)
*H04N 13/161* (2018.01)
*H04N 13/189* (2018.01)
*H04N 13/178* (2018.01)
*H04N 13/243* (2018.01)
*H04N 13/296* (2018.01)

(52) U.S. Cl.
CPC ..... *H04N 5/23293* (2013.01); *H04N 5/23238* (2013.01); *H04N 13/161* (2018.05); *H04N 13/178* (2018.05); *H04N 13/189* (2018.05); *H04N 13/243* (2018.05); *H04N 13/296* (2018.05)

(58) Field of Classification Search
CPC .......... H04N 5/23293; H04N 5/23238; H04N 13/189; H04N 13/178; H04N 13/296; H04N 13/161; H04N 13/243
See application file for complete search history.

(56) References Cited

U.S. PATENT DOCUMENTS 9,578,279 B1 *   2/2017   Mysore Vijaya Kumar ................
G06K 9/4642
9,635,307 B1 *   4/2017   Mysore Vijaya Kumar ................
H04N 5/917
9,818,451 B1 *   11/2017   Tyagi ..................... G11B 27/34
(Continued)

FOREIGN PATENT DOCUMENTS

WO   WO-2010145499 A1 * 12/2010   ......... H04N 5/23238

*Primary Examiner* — John R Schnurr
(74) *Attorney, Agent, or Firm* — Fenwick & West LLP

(57) ABSTRACT

A camera system provides a live preview that provides a user device a pseudo-real time depiction of what the camera assembly is imaging. The camera system captures images from a plurality of cameras. The camera system captures images from a plurality of cameras. The camera system stores the captured images in respective memory locations of a buffer. The stored captured images form a high priority data stream that generates content associated with the portion of the local area. The camera system selects, as part of a low priority data stream, one or more of the images from memory locations. The camera system encodes the selected one or more images. The camera system packetizes the encoded one or more images to form an image frame in a video feed. The camera system provides the image frame to a user device that presents the image frame as part of the video feed.

22 Claims, 9 Drawing Sheets

(56) References Cited

U.S. PATENT DOCUMENTS

| | | | |
|---|---|---|---|
| 2007/0025723 A1* | 2/2007 | Baudisch | G03B 13/02 |
| | | | 396/287 |
| 2017/0208315 A1* | 7/2017 | Rajak | H04N 13/161 |
| 2017/0295324 A1* | 10/2017 | Cabral | H04N 5/23206 |
| 2018/0121069 A1* | 5/2018 | DiVerdi | G06F 3/04847 |
| 2018/0146137 A1* | 5/2018 | Roulet | G06T 5/002 |

* cited by examiner

THREE-DIMENSIONAL, 360-DEGREE VIRTUAL REALITY CAMERA LIVE PREVIEW

CROSS REFERENCE TO RELATED APPLICATIONS

This application claims the benefit of U.S. Provisional Application No. 62/485,480, filed Apr. 14, 2017, which is incorporated by reference in its entirety

BACKGROUND

The disclosure relates generally to camera imaging, and more specifically to live preview of a three-dimensional (3D), 360-degree camera system.

Virtual reality systems capture images and/or video of an environment with one or more cameras. The images and/or video captured by the cameras are reconstructed to create a virtual reality that a user can interact with. The configuration of the one or more cameras impacts the quality of the images captured and the ability to reconstruct the images for a seamless virtual reality experience. Hence, the configuration of the cameras and lower quality captured images can adversely affect a user's virtual reality experience.

Conventional 360 degree cameras operate by stitching a plurality of frames together into a single 360 degree frame. The single 360 degree frame is provided to one or more viewing users. However, it takes time to stitch the plurality of frames to form the single 360 degree frame. Thus, the single 360 degree frame is not able to depict in real time what the 360 degree camera are imaging.

SUMMARY

A camera system provides a live preview of captured images. The camera system includes a three-dimensional (3D), 360-degree camera assembly that captures the images. The live preview provides the user device a pseudo-real time depiction of what the camera assembly is imaging. The camera assembly captures images from a plurality of cameras each having a respective field of view of a portion of a local area, and a combined field of view of the plurality of cameras spans 360 degrees of the local area. The camera system stores the captured images in respective memory locations of a buffer. The memory locations are associated with a time stamp of a captured image and an identifier of the camera that captured the image, and the stored captured images form a high priority data stream that generates content associated with the portion of the local area. The camera system selects, as part of a low priority data stream, one or more of the images from memory locations. The selecting has a lower priority than operations associated with the higher priority data stream, and the selected one or more images are associated with a same time stamp. The camera system encodes the selected one or more images. The camera system packetizes the encoded one or more images to form an image frame in a video feed. The camera system provides the image frame to a user device that is configured to present the image frame as part of the video feed.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
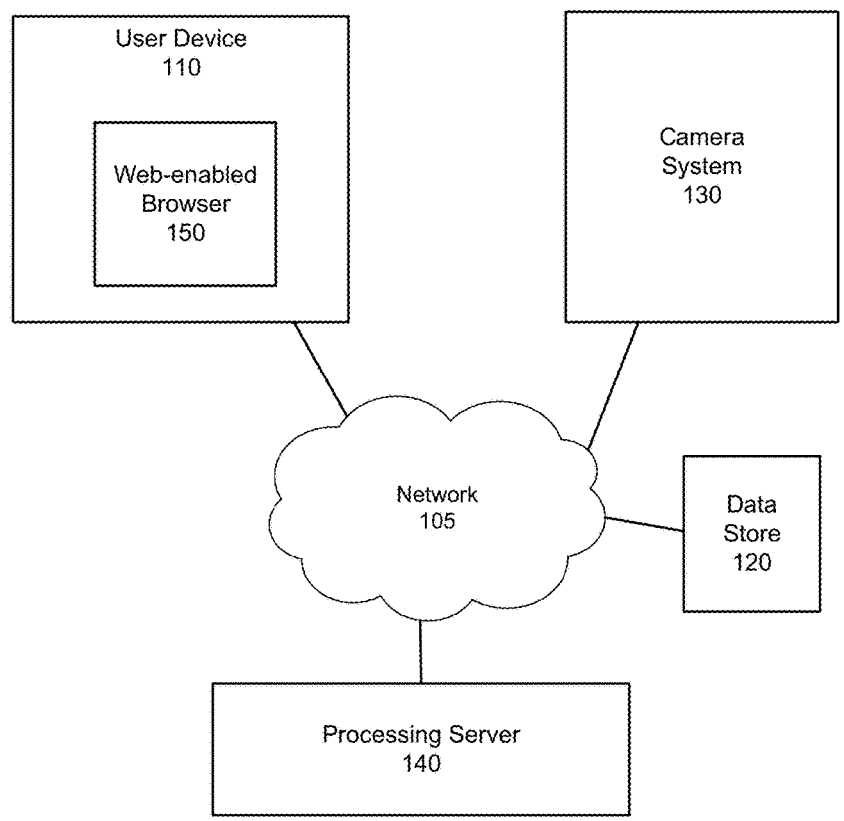
FIG. 1 is a high-level block diagram illustrating an embodiment of a system for generating 3D-360 degree content for a virtual reality system, according to an embodiment.

FIG. 1 is a high-level block diagram illustrating an embodiment of a system 100 for generating 3D-360 degree content for a virtual reality system, according to an embodiment. The system 100 includes a network 105 that connects a user device 110 to a data store 120, a camera system 130, and a processing server 140. In the embodiment of FIG. 1, only one user device 110 is illustrated, but there may be multiple instances of this entity. For example, there may be multiple user devices 110 coupled, via the network 105, to the data store 120, the camera system 130, and the processing server 140.

The network 105 provides a communication infrastructure between the user devices 110, the data store 120, the camera system 130, and the processing server 140. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

The user device 110 is a computing device that executes computer program modules—e.g., a web-enabled browser 150 or some other client application—which allow a user to view a user interface for the camera system 130. A user device 110 might be, for example, a personal computer, a tablet computer, a smart phone, a laptop computer, or other type of network-capable device.

The data store 120 stores image information from the camera system 130 and the processing server 140. In some embodiments, the data store 120 can be cloud-based and is accessed by the camera system 130 and the processing server 140 via the network 105. The data store 120 may receive and store image information directly from the camera system 130, or the data store 120 may receive and store image information from the processing server 140 after the image information has been processed. In one embodiment, the data store 120 is a part of the processing server 140. In another embodiment, the data store 120 is an archive maintained by a third-party storage provider.

The camera system 130 generates image information using captured images and/or audio information of a local area surrounding the camera system 130. The camera system 130 comprises an assembly of cameras positioned to capture a 360 degree view of the local area. In the embodiment of FIG. 1, the assembly includes a plurality of cameras mounted to a rigid surface or structure. At least a portion of the plurality of cameras are arranged such that adjacent cameras may produce stereo images of the local area. Embodiments of the camera system 130 are discussed in detail below with regard to FIGS. 2 through 7.

The local area is the environment that surrounds the camera system 130. For example, the local area may be a room that the camera system 130 is inside, or the camera system 130 may be outside and the local area is an outside area that is visible to the camera system 130. Image information is information output by the camera system 130. Image information may include, e.g., one or more images, audio information (e.g., sounds captured by one or more microphones), video information, metadata, or some combination thereof. Metadata is additional information associated with the image information. Metadata may include, e.g., frame rate, exposure setting (e.g., aperture, shutter speed, gain, etc.), copyright information, date/time information, time stamp associated with each image, camera identifier, names, labeling, some other information associated with the image information, or some combination thereof. The camera system 130 includes memory storage that buffers and stores the image information. In some embodiments, the camera system 130 may be locally coupled to (e.g., via some wired and/or wireless connection) an external data store. In some embodiments, the camera system 130 sends the image information to the processing server 140 via the network 105. In alternate embodiments, the camera system 130 processes the image information to form 3D-360 degree content at a high resolution. For example, 3D-360 degree content video content may be at, e.g., 4K, 6K, 8K resolution, or some other resolution supported by the camera system 130.

The camera system 130 receives instructions from a user to capture image information of the local area. For example, the camera system 130 can include a web server that allows users to control the camera system 130 using, e.g., the web-enabled browser 150 on the user device 110 via the network 105. The camera system 130 determines a global exposure setting (e.g., gain, shutter speed, aperture) using information from one or more cameras in the camera assembly 130, and applies the global exposure setting to all of the cameras in the camera system 130. Accordingly, each camera, regardless of a light metering specific to that camera, uses the global exposure setting. The camera system 130 synchronizes the capture of the image information using a global shutter that causes all of the cameras in the camera system 130 to take an exposure (using the global exposure setting) at the same time (e.g., using a global shutter). Accordingly, both exposure and time a frame is taken is consistent across all of the image information.

The camera system 130 produces a high priority data stream and a low priority data stream. The high priority data stream includes images captured from all of the plurality of cameras that generate content. The low priority data stream includes images captured from some or all of the plurality of cameras to provide a live preview to one or more user devices 110. For example, the cameras system 130 stores captured image by each camera of the plurality of cameras in a respective memory location of a buffer. The memory locations are associated with a time stamp of a captured image and an identifier of the camera that captured the image. The stored captured images form a high priority data stream that generates content associated with the portion of the local area. The camera system 130 selects one or more of the images from memory locations as part of a low priority data stream. The selected one or more images have a lower priority than operations associated with the high priority data stream, and the selected one or more images are associated with a same time stamp. The camera system 130 provides the selected images to one or more user devices 110 via the web-enabled browser 150. Because the selected images are discrete images without stitching that it takes longer time to process. The live preview provides the user device user of a pseudo-real time depiction of what the camera system 130 is imaging. In some embodiments, the selected images are not from each of the plurality of cameras, accordingly, the selected image may not give all the information of the local area surrounding the camera system 130 at a particular time value. For example, during a given time, the camera system 130 selects one or more images from the high priority data stream. If operations associated with the high priority data stream occur, the camera system 130 stops selecting images and instead performs the operations. After completing operations associated with the high priority data stream, the camera system 130 switches back to selecting images. Thus, the selected images may not be continuous in time. Additionally, for a given time the camera system 130 may not be able to select images from each of the plurality of cameras before high priority operations supersede image selection. Accordingly, at a first time images from some subset of the plurality of cameras may be selected. The process for determining the low priority data stream is further described in detail below with regard to FIGS. 5A through 6.

The processing server 140 generates 3D-360 degree content using image information. 3D-360 degree content is media content associated with a 360-degree field of view of the camera system 130 and at least a portion of which includes depth information and may be rendered in three dimensions (3D). 3D-360 degree content may include, e.g., an image, a video, audio information, or some combination thereof. The processing server 140 may generate the 3D-360 degree content in high resolution. For example, 3D-360 degree content video content may be at, e.g., 4K, 6K, 8K resolution, or some other resolution supported by the camera system 130. For example, 3D-360 degree content may be a video of the local area, the video being a merged representation of the images taken by the camera system 130, and which renders in 3D portions of the video corresponding to images taken by the peripheral cameras.

The processing server 140 receives the image information from the camera system 130, the data store 120, or some combination thereof. The processing server 140 is configured to create 3D-360 degree content with an algorithm performed by a set of computer-implemented instructions. The algorithm identifies a set of images in the image information associated with a same time value (e.g., metadata indicates captured at the same time), and merges the images into a single frame of 3D-360 degree content. Additionally, the processing server 140 may generate video files by coupling together multiple frames of 3D-360 degree content associated with different times. The 3D-360 degree content is output by the processing server 140 and can be stored in the data store 120 for access at a later time.

The system 100 beneficially allows a user to capture image information of a local area and construct 3D-360 degree content of the local area that may be used in, e.g., a virtual reality (VR) environment, or some other environment (e.g., augmented reality and/or mixed reality). The system 100 has a rigid structure, a synchronous operation, and a web-based interface. The rigidity of the camera system 130 prevents the plurality of cameras from moving with respect to each other once each camera has been aligned and calibrated, making it easier to process the image information and fuse the images together to construct the 3D-360 degree content. The synchronicity of the plurality of cameras allows for global setting to be applied to each camera and improves the quality of the image information captured, which, in turn, improves the quality of the 3D-360 degree content that is constructed. The web-based interface provides ease-of-use for a user to set up the system 100, preview captured image information, apply global setting, process image information, and access, use, or store 3D-360 degree content.

Example of Camera System

Figure 2:
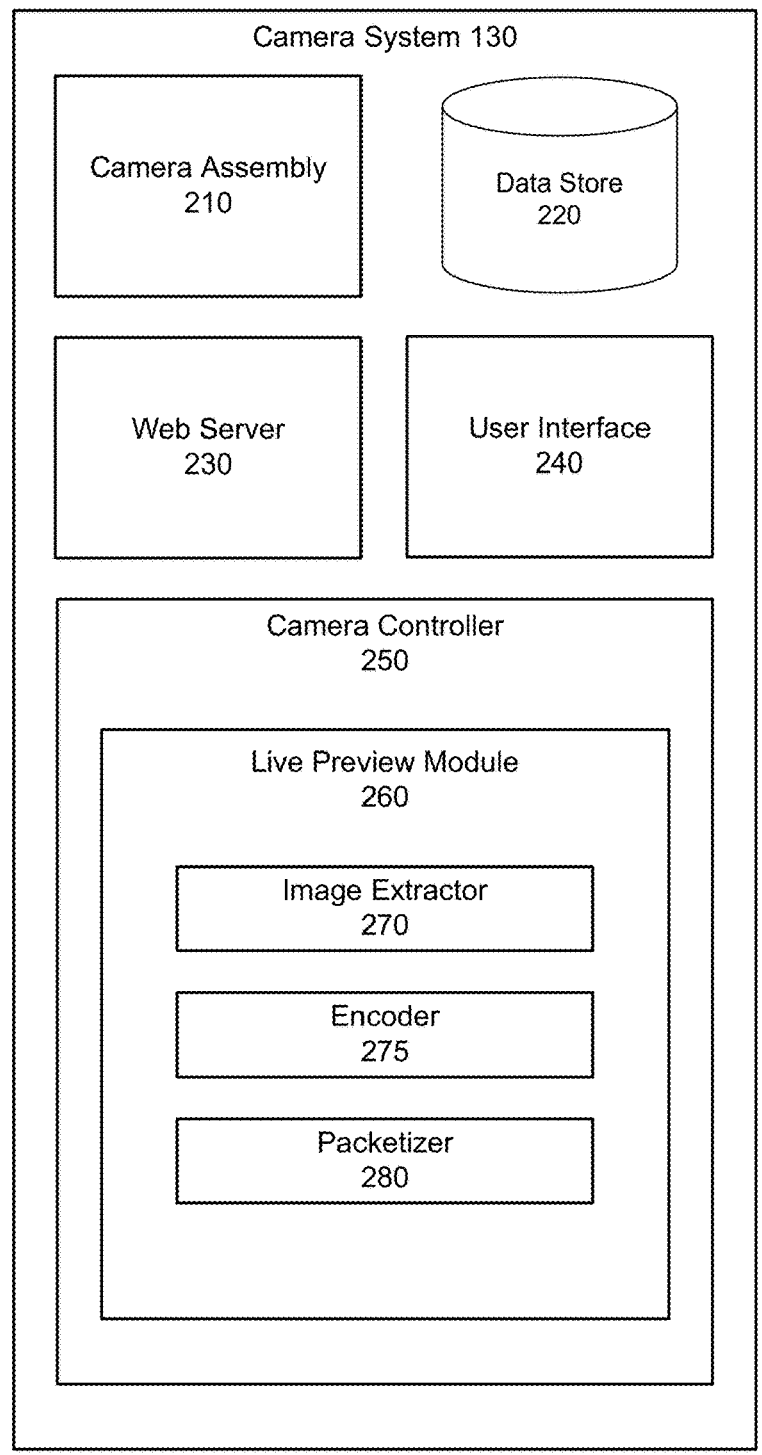
FIG. 2 is a high-level block diagram illustrating a detailed view of modules including a live preview module within a camera system, according to an embodiment.

FIG. 2 is a high-level block diagram illustrating a detailed view of modules including a live preview module within the camera system 130, according to an embodiment. Some embodiments of the camera system 130 have different modules than those described here. Similarly, the functions can be distributed among the modules in a different manner than is described here. The camera system 130 is comprised of modules including a camera assembly 210, a data store 220, a web server 230, a user interface 240, and a camera controller 250 including a live preview module 260.

The camera assembly 210 captures image information using a plurality of cameras that are positioned to view 360 degrees of a local area. In some embodiments, the camera assembly 210 includes a plurality of peripheral camera and a plural of axis cameras. An example is further described in FIG. 3. The image information may include, e.g., one or more images, audio information, video information, metadata, or some combination thereof. The image information can be captured in various file formats for images (e.g., .jpeg, .tif, .png, etc.), audio (e.g., .aac, .mp3, .wav, etc.), and/or video (e.g., .mpg, .mov, .wmv, etc.). The camera assembly 210 captures the image information responsive to instructions from the camera controller 250. In some embodiments, the camera assembly 210 ensures that the image information captured from each peripheral camera and axis cameras is consistent and allows for the construction of uniform, natural-looking 3D-360 degree content. The camera assembly 210 captures and sends some or all of the image information to, e.g., the user interface 240, the data store 220, the processing server 130, the data store 120, or some combination thereof.

The data store 220 of the camera system 130 is a local memory storage that stores image information. The data store 220 receives and stores the image information from the camera assembly 210. In some embodiments, the data store 220 may upload image information to, e.g., an external data store (e.g., data store 120), a processing server (e.g., processing server 130), or some combination thereof. In some embodiments, the data store 220 acts as a buffer. For example, the camera system 130 may generate image information at a rate that exceeds an upload rate to an external data store and/or a processing server. Accordingly, the data store 220 may temporarily buffer the image information to ensure that the upload rate does not exceed to the external data store and/or a processing server. In the some embodiments, the data store 220 may include multiple memories, and the image information may be written to in a distributed fashion across the multiple memories. For example, in some embodiments, the data store 220 may be in a RAID 5 configuration that includes block-level striping with distributed parity. This would allow large amounts of data to be written in a continuous manner. For example, at 30 Hz the camera assembly 210 may produce approximately 17 Gb/s at a sustained transfer rate. The data store 220 can receive and store the large amounts of image information at a sustained rate.

In some embodiments, the data store 220 is configured to function, at least in part, as a circular buffer. The circular buffer is an area of memory in the data store 220 that includes multiple buffer elements (i.e., memory locations) used to temporarily store the image information (e.g., RAW data) captured from the camera assembly 210. The circular buffer allows the buffer elements to be filled and emptied at the same time for transmitting large datasets efficiently. Typically, the circular buffer has a head pointer and a tail pointer. The head pointer is used for a producer writing image information into the buffer elements. The tail pointer is used for a consumer reading the image information in the buffer elements.

In some embodiments, the image information captured by the camera assembly 210 includes a plurality of frames (e.g., in the order of thousands). The size of circular buffer is much larger than the total number of frames captured at a given time by the camera assembly 210. For example, the circular buffer may have a 1000 or more individual buffer elements. Once the head pointer points at a first buffer element of the circular buffer, the producer writes image information associated with one of the cameras in the camera assembly 210 into the first buffer element of the circular buffer. Then, the head pointer moves to a second buffer element of the circular buffer, and the producer writes image information associated with another camera in the camera assembly 210 into the second buffer element of the circular buffer, and so forth. For example, if the camera assembly 210 includes a total of 16 cameras, each trigger of the camera assembly 210 produces 16 images, and the 16 images are written to the corresponding 16 respective buffer elements. The consumer reads the first frame at the first buffer element and transmits the first frame to the memory storage embedded in the data store 220 or to the external data store (e.g., the data store 120), and so forth. In some embodiments, the image information is sequentially stored in a binary file format. The image information may later be extracted from the binary file and converted, via the processing server 140, into color (or Black and White) 3D-360 degree content.

In some embodiments, the circular buffer has multiple producers and multiple consumers. Each producer and each consumer may have a separate thread and operate independently. For one example, one producer is used for each camera. The producer for each camera works independently. For another example, different producers are used for different groupings of cameras in the camera assembly 210, e.g., one producer is used for a half portion of the camera assembly 210 and the other different producer is used for the other half portion of the camera assembly 210.

In some embodiments, multiple consumers are associated with different data storage devices (e.g., hard drives). The different data storage devices may operate independently from each other. In some embodiments, each data storage device has a separate consumer. This configuration allows data to continuously flow from the circular buffer to the plurality of different data storage devices. For example, in some embodiments, two different data storage devices (e.g., a first and second data storage device) are used. And while the first data storage device is writing image information from the circular buffer, the second data storage device is seeking data. The second data storage device then writes image information, and the first data storage device seeks data, and so on. The corresponding consumers switch back and forth from the two storage devices, which facilitates writing image information to the multiple data storage devices at a speed fast enough for continuous operation of the camera assembly 210 (i.e., image information may be extracted from the circular buffer before it is overwritten).

In some embodiments, consumers send frames to another location for other processing. For one example, a consumer sends a frame to the web server 230 for further processing. For another example, a consumer sends a frame to the user interface 240 for previewing the frame.

The web server 230 serves as a network 105 interface of the camera system 130. The web server 230 transfers data from the camera assembly 210 through the network 105 to the user device 110, the processing server 140, some other entity, or some combination thereof. In some cases, the camera assembly 210 may transfer data to the web server 230 using a wired interface (e.g., USB). The data can be compressed or uncompressed.

The user interface 240 allows a user of the user device 110 to interface with the camera system 130. In some embodiments, the user interface 240 is a graphical user interface (GUI). An example user interface is described in detail below with regard to FIG. 7. The user interface 240 provides a live preview interface to present the selected images to the web-enabled browser 150 included in one or more user devices 110. The user interface 240 may allow the user of the user device 110 to control the settings of the camera assembly 210 based on the live preview. The user interface 240 may also allow the user of the user device 110 to select one or more cameras to generate a live preview. For example, the user of the user device 110 may select one or more identifiers associated with the plurality of cameras via the user interface 240 to generate the live preview. The camera controller 250 selects corresponding images associated with the selected identifiers to generate the live preview. In some embodiments, the live preview interface includes an empty template that labels each location with a corresponding identifier of the plurality of cameras. In some embodiments, the user interface 240 may be accessed through a network connection on a mobile phone, tablet, PC, etc. or any other device that has a network connection. In alternate embodiments, the user interface 240 may include a display and one or more input/output devices (e.g., mouse keyboard) that are directly coupled to the camera assembly 210.

The camera controller 250 is configured to control the operation of the camera assembly 210. In the embodiment of FIG. 2, the camera assembly 210 is configured to have one camera act as a principal camera, and the additional cameras act as ancillary cameras. The principal camera is the camera in which the camera controller acts as the master of a plurality of other cameras. The ancillary camera is the camera in which the camera controller acts as the slave to the master camera. The principal camera may be any peripheral camera 210 or axis camera; in the embodiment of FIG. 3, the principal camera is the top axis camera 212 coupled to the top plate 202.

The camera controller 250 controls exposure settings for cameras in the camera assembly 210. The exposure of a camera determines how light or dark an image will appear when captured by a camera. In some embodiments, the camera controller 250 instructs the camera assembly 210 to determine exposure setting for each of the cameras in the camera assembly 210. The camera controller 250 determines a global exposure setting using the determined exposure settings, and provides the global exposure setting to all of the cameras in the camera assembly 210. A global exposure setting is a single exposure setting that is applied to all of the cameras in the camera assembly 210.

The camera controller 250 controls a global shutter of the camera assembly 210. A global shutter synchronizes the shutter of each camera in the camera assembly 210, such that each shutter opens at the same time (i.e. within less than 1 millisecond of one another), allowing the camera assembly 210 to capture synchronous image information. The camera controller 250 may instruct a principal camera to provide a master trigger signal to the ancillary cameras in the camera assembly 210. The master trigger signal commands the shutter of each ancillary camera to open at the same time as the shutter of the principal camera. Capturing synchronous image information ensures that individual images match and can be accurately stitched together by the processing server 140 to construct the 3D-360 degree content.

The camera controller 250 generates instructions to produce a high priority data stream and a low priority data stream. To form the high priority data to generate content, the camera controller 250 instructs the camera assembly 210 to store the captured images in respective memory locations of a buffer in the data store 220. The memory locations are associated with a time stamp of a captured image and an identifier of the camera that captured the image, and the stored captured images form the high priority data stream. An example of content generated by the high priority data stream is described below in detail with regard to FIG. 4. To form the low priority data stream to generate a live preview, the camera controller 250 uses a live preview module 260 that selects one or more images from the high priority data stream during a given time period. The live preview module 260 generates one or more image frames in a video feed based on the selected one or more images and provides the one or more image frames to the user interface 240 for displaying the image frames in pseudo-real time to one or more user devices 110. The live preview module 260 generates discrete image frames without stitching that it takes longer time to process, and without significantly increasing bandwidth that impedes speed. As such, the live preview is able to reflect the local area in almost real time. Examples of content generated by the low priority data stream are described in detail with regard to FIGS. 5B through 5C.

As shown in FIG. 2, the live preview module 260 includes an image extractor 270, an encoder 275, and a packetizer 280. Some embodiments of the live preview module 260 have different modules than those described here. For example, the live preview module 260 may include an image processor to convert RAW data into image data via downsampled and/or colored image processing. Similarly, the functions can be distributed among the modules in a different manner than is described here.

The image extractor 270 selects images associated with a same time from the buffer that buffers the high priority stream data. The selected images are for at least one camera of the plurality of cameras. For example, at a particular time slot $T_1$, the image extractor 270 copies images of a first portion of the plurality of cameras from the buffer storing images captured from all the cameras. At a particular time slot $T_2$, the image extractor 270 copies images of a second portion of the plurality of cameras from the buffer storing images captured from all the cameras. At a particular time slot $T_3$, the image extractor 270 copies images of a third portion of the plurality of cameras from the buffer storing images captured from all the cameras. $T_3$ is subsequent to $T_2$ that is subsequent to $T_1$. $T_1$, $T_2$ and $T_3$ may vary based on when the operation associated with the high priority data stream starts and ends. As such, the first, the second and the third portions may have different number of images, and may not be continuous. As the data stream is low priority, the intervals among $T_1$, $T_2$ and $T_3$ may vary. The intervals depend on operation time associated with the high priority data stream. An example is further described in detail below with regard to FIG. 5A.

The image extractor 270 selects images based on one or more selecting rules that determine how to select images from the high priority data stream. Examples of the selecting rule may include selecting images from one or more selected cameras of the plurality of cameras, selecting how many images for each time slot, or selecting images based on a priority rule. The priority rule determines priority ranking of operations of each camera. For example, the top and bottom cameras may have lower priority than the peripheral cameras. If operations associated with the peripheral cameras occur, the image extractor 270 selects images from the top camera and/or bottom camera. In another example, the cameras have different weights associated with the priority. Higher weight has higher priority. The top and bottom cameras may have lower weight than the peripheral cameras. Different peripheral cameras may have different weights. For example, the peripheral cameras having front view of the local area may have higher weights than the peripheral cameras having side views and back views. In some embodiments, based on the priority rule, the image extractor 270 selects one or more cameras of the plurality of cameras, and the image extractor 270 selects images from the selected one or more cameras. In some embodiments, a user of the user device 110 may select one or more cameras and/or may select how many images for each time slot via the user interface 240 through the web-enabled browser 150 included in the user devices 110.

The encoder 275 encodes the images selected from the image extractor 270. In some embodiments, the encoder 275 may generate compressed image data by encoding image data and stores the compressed image data. The image data is converted, via an image processor (not shown in FIG. 2), from RAW data and has a format of a particular color space. For example, the image processor downsamples RAW data (e.g., captured images) and coverts the down-sampled RAW data into YUV image data in a format of the YUV color space. The encoder 275 encodes the YUV image data using one or more encoding algorithms, e.g., H.264, HEVC and VP9 encoding algorithms, and the encoder 270 may implement any other suitable image or video encoding algorithms.

In some embodiments, the live preview module 260 includes multiple encoders, each corresponding to a different camera in the plurality of cameras and configured to encode the image data in a format of a particular color space independently. The encoder corresponding to each camera may be synchronized such that each encoder encodes the image data at substantially the same time.

The packetizer 280 packetizes the encoded images to form image frames in a video feed. For example, the packetizer 280 partitions the encoded images into packets. In some embodiments, the packetizer 280 combines old encoded images selected during one or more previous time slots with new encoded images selected during current time slot. The packetizer 280 partitions the encoded images including old images selected during all previous time slots and new images selected during a final time slot into packets. For example, if a given time period to generate a live preview includes three time slots. During a first time slot, a first set of images is selected and encoded. During a second time slot, a second set of images is selected and encoded. The packetizer 280 combines the first set with the second set to generate a first combined set. During a third time slot that is a final time slot, a third set of images is selected and encoded. The packetizer 280 combines the first combined set with the third set to generate a second combined set, and the packetizer 280 partitions the second combined set into packets. An example is further described in detail with regard to FIG. 5B. In some embodiments, the packetizer 280 partitions encoded image selected during each time slot into packets. The individual packetized images and the user interface 240 that includes an empty template and instructions are sent to the user device 110 via the network 105. The instructions includes commands that instruct the user device 110 to fill the individual packetized images into the empty template based on identifiers of the plurality of camera. The template labels each location with a corresponding identifier of the plurality of cameras. The user device 110 is instructed to fill the individual packetized images into corresponding labeled locations in the template. For example, an individual packetized image is captured by the top camera. The user device 110 fills the individual packetized image into a location labeled by a corresponding identifier of the top camera in the empty template. An example is further described in detail with regard to FIG. 5C.

In some embodiments, the live preview module 260 includes multiple packetizers, each corresponding to a different camera in the plurality of cameras and configured to packetize the encoded image data independently. The packetizer corresponding to each camera may be synchronized such that each packetizer packetizes the image data at substantially the same time.

Figure 3:
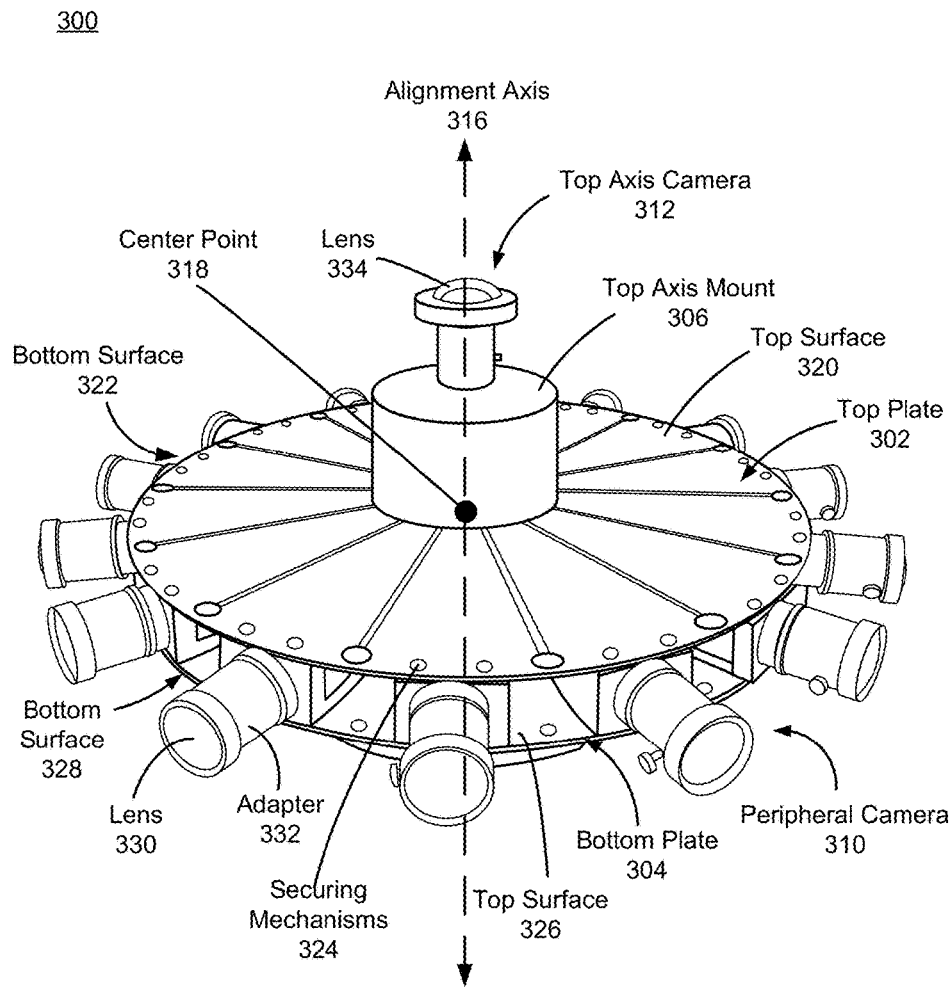
FIG. 3 illustrates a perspective view of a camera assembly for capturing image information, according to an embodiment.

FIG. 3 illustrates a perspective view of a camera assembly 300 for capturing image information, according to an embodiment. In some embodiments, the camera assembly 300 is an embodiment of the camera assembly 210 in the camera system 130. Alternatively, the camera assembly 300 may be part of some other system. Some embodiments of the camera assembly 300 have different components than those described here. Similarly, in some cases, functions can be distributed among the components in a different manner than is described here.

As described in greater detail below, the camera assembly 300 generates image information using captured images and/or audio information of a local area. The camera assembly 300 includes a top plate 302, a bottom plate 304, a top axis mount 306, a bottom axis mount (not shown in FIG. 3), a plurality of peripheral cameras 310, and a plurality of axis cameras including a top axis camera 312 and a bottom axis camera (not shown in FIG. 3). The top plate 302, the bottom plate 304, the top axis mount 306, the bottom axis mount (not shown in FIG. 3), the top axis camera 312, and the bottom axis camera (not shown in FIG. 3) are aligned along an alignment axis 316. The plurality of peripheral cameras 310 are arranged such that they form a ring around a center point 318 that is bisected by the alignment axis 316. The top plate 302 couples to a top surface of the ring of peripheral cameras 310, and the bottom plate 304 couples to a bottom surface of the ring of peripheral cameras 310. This configuration creates a rigid structure that prevents vibration and overheating of the peripheral cameras 310 and allows the peripheral cameras 310 to capture quality images and/or video that are used to generate the portion of 3D content in the 3D-360 degree content.

The top plate 302 is configured to secure the plurality of peripheral cameras 310 and one or more axis cameras (e.g., top axis camera 312). The top plate 302 includes a top surface 320, a bottom surface 322, and a plurality of securing mechanisms 324. The top plate 302 is composed of a rigid material and is substantially disk-shaped. The rigid material may be, e.g., a metal (e.g., aluminum, steel, etc.), a rigid plastic, some other rigid material, or some combination thereof. The top surface 320 couples a top axis mount 306 to the top plate 302, such that the top axis mount 306 is centered along the alignment axis 316. Along the periphery of the top plate 302 are the plurality of securing mechanisms 324. Each securing mechanism 324 is configured to secure a peripheral camera 310 to the bottom surface 322 of the top plate 302. For example, the securing mechanisms 324 may be mechanical fasteners (e.g. screws, bolts) that couple the top plate 302 to the plurality of peripheral cameras 310.

The bottom plate 304 is configured to secure the plurality of peripheral cameras 310 and one or more axis cameras (e.g. bottom axis camera) and is substantially similar to the top plate 202. The bottom plate 304 includes a top surface 326, a bottom surface 328, and a plurality of securing mechanisms 324. The bottom plate 304 is composed of a rigid material and is substantially disk-shaped. The rigid material may be, e.g., a metal (e.g., aluminum, steel, etc.), a rigid plastic, some other rigid material, or some combination thereof. The bottom surface 328 is configured to couple a bottom axis mount (not shown in FIG. 3) to the bottom plate 304, such that a bottom axis mount (not shown in FIG. 3) is centered along the alignment axis 316. Along the periphery of the bottom plate 304 are an additional plurality of securing mechanisms 324, wherein each securing mechanism 324 secures a peripheral camera 310 to the top surface 326 of the bottom plate 304. The bottom surface 328 is further configured to couple to a support structure that provides standing or mounting support and stability for the camera system 130. The support structure can be a variety of mounts (e.g. monopod, tripod, quadrantpod, wall mount, etc.).

The axis mounts are configured to secure an axis camera (e.g. top axis camera 312 or bottom axis camera) perpendicular to a surface of the top plate 302 or the bottom plate 304. The axis mounts are substantially cylindrical and hollow within. This configuration allows an axis camera to be vertically offset from the surface of the top plate 302 or the bottom plate 304, allowing for less overlap of the field of views of the axis cameras and the peripheral cameras 310. Wires connecting to the axis cameras may be hidden within the hollow portion of the axis mounts. In the embodiment of FIG. 3, the top axis mount 306 is coupled to the top surface 320 of the top plate 302, and the bottom axis mount (not shown in FIG. 3) is coupled to the bottom surface 328 of the bottom plate 304. Each axis mount is aligned along the alignment axis 316 and provides stability for an axis camera.

The peripheral cameras 310 are configured to capture images and/or video of a 360 degree view of the local area. The peripheral cameras 310 are positioned such that they form a ring around the center point 318 that is bisected by the alignment axis 316. The plurality of peripheral cameras 310 are positioned around the center point 318 such that an optical axis of each peripheral camera 310 is within a plane, and a field of view of each peripheral camera 310 faces away from the center point 318. Each peripheral camera 310 is positioned next to the adjacent peripheral camera 310 at a certain distance and at certain angle. This configuration allows the captured images and/or video, once processed into 3D-360 content to include stereoscopic (also referred to as stereo) portions. In some embodiments, the distance and the angle measure approximately the same as the inter-pupillary distance and the angle between the human eyes, respectively. This configuration allows the captured images and/or video to simulate a human's perception of vision. The number of peripheral cameras 310 may vary and can depend on the size of the top plate 302 and the bottom plate 304, and/or a field of view of each of the peripheral cameras 310. In the embodiment of FIG. 3, there are fourteen peripheral cameras 310 which form the ring and capture a 360 degree view of the environment. In other embodiments, there may be more or less peripheral cameras 310.

A peripheral camera 310 includes a sensor (not shown), a lens 330, and a camera controller (not shown). The sensor is an electrical device that captures light using an array of photo-sensitive pixels, wherein each pixel converts light into an electronic signal. Sensors can have varying features, such as resolution, pixel size and sensitivity, light sensitivity, type of shutter, and type of signal processing. The lens 330 is one or more optical elements of a camera that facilitate focusing light on to the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the peripheral camera 310 may have a microphone to capture audio information. The microphone can be located within the camera or may located external to the camera.

The camera controller (not shown) is able to determine exposure setting (e.g. aperture, gain, and shutter) for the camera based on light incident on the sensor. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the peripheral cameras 310 act as ancillary cameras, the shutter and exposure setting are set globally by a principal camera. In the embodiment of FIG. 3, the peripheral camera 310 includes several properties, such as a small form factor, high resolution (e.g., 2048×2048), a high frame rate (e.g., 90 frames per second), a 1" sensor, and a C-mount for a lens. The field of view of each peripheral camera 310 can range between 50-180 degrees. A field of view ranging from ~50 to 120 degrees is generally referred to as a wide field of view, and a field of view larger than 120 degrees is generally referred to as a fish eye field of view. In the embodiment of FIG. 3, the lens 330 has an optical coating that blocks infrared light, an f/2.4 aperture, a CS-mount for a camera, and a horizontal and vertical field of view of 92 degrees. The effective field of view of the lens 330 is 77 degrees after correction for barrel distortion. In other embodiments, each of the peripheral cameras 310 may have a different field of view. For example, each of the peripheral cameras 310 may have a 180 degree field of view (i.e., a fish eye lens). Extremely wide fields (i.e., fish eye) of views have the potential to reduce the number of peripheral cameras used to generate stereoscopic portions of the 3D-360 degree content, however, processing of the image information becomes more difficult as the image information tends to include larger amounts of distortion.

An adapter 332 allows for the use of off-the-shelf components in the camera assembly 300. The adapter 332 is configured to couple the peripheral camera 310 to the lens 330 by securing to the C-mount of the peripheral camera 310 at a first end and securing to the CS-mount of the lens 330 at a second end.

Each peripheral camera 310 further includes a plurality of securing mechanisms to secure the peripheral camera 310 between the top plate 302 and the bottom plate 304. The securing mechanisms are reciprocal to the securing mechanisms 324, allowing the peripheral camera 310 to couple to the bottom surface 322 of the top plate 302 and to couple to the top surface 320 of the bottom plate 304. In the embodiment of FIG. 3, each of the peripheral cameras 310 is positioned such that the lens 330 points radially outward from the center point 318. The peripheral cameras 310 may be battery-powered, powered via cables and a cable interface (e.g. a universal serial bus (USB) interface), or some combination thereof. Additionally, some embodiments may have support structures mounted between the top plate 302 and the bottom plate 304 to increase rigidity and stability of the camera assembly 300. The support structures may be posts, support blocks, or some combination thereof.

The plurality of axis cameras are configured to capture images and/or video of top and bottom views of the local area. The axis cameras include a top axis camera 312 and a bottom axis camera (not shown in FIG. 3) that are secured to their respective axis mounts and positioned such that both the top axis camera 312 and the bottom axis camera are aligned along the alignment axis 316 such that an optical axis of each axis camera is collinear with the alignment axis 316. The field of view of the top axis camera 312 and the field of view of the bottom axis camera are directed away from the center point 318 of the camera assembly 300.

The top axis camera 312 provides a top view of a portion of the local area, while a bottom axis camera (not shown in FIG. 3) provides a bottom view of a different portion of the local area. As previously described, the top and bottom axis cameras are vertically offset relative to the peripheral cameras 310 to limit the overlap between the fields of view. The number and orientation of axis cameras may vary. In the embodiment of FIG. 3, there are two axis cameras which capture a top and bottom view of the local area. In alternate embodiments, the camera assembly 300 includes two bottom axis cameras, which are arranged such that the field of view of the first bottom axis camera and the field of view of the second bottom axis camera have sufficient overlap to remove the mount that supports the camera assembly 300 as an occlusion in the 3D-360 degree content. In other embodiments, the top plate 302 and the bottom plate 304 may each secure a plurality of axis cameras, such that the arrangement of the axis cameras covers a hemisphere and provides a spherical field of view.

An axis camera includes a sensor (not shown), a lens 334, and a camera controller (not shown). The sensor is an electrical device that captures light using an array of photosensitive pixels, wherein each pixel converts light into an electronic signal. Sensors can have varying features, such as resolution, pixel size and sensitivity, light sensitivity, type of shutter, and type of signal processing. The lens 334 includes one or more optical elements of a camera that facilitates focusing light on the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the axis cameras may have a microphone to capture audio information. The microphone can be located within the camera or may be located external to the camera.

The camera controller (not shown in FIG. 3) is able to determine exposure setting (e.g. aperture, gain, and shutter) for the camera and controls the frame rate. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the axis cameras act as ancillary cameras, the shutter and exposure settings are set globally by a principal camera. In the embodiment of FIG. 3, the axis cameras include several properties, such as a small form factor, high resolution (e.g. 2048×2048), a high frame rate (e.g., 90 frames per second), a 1" sensor, and a C-mount for a lens. The field of view of each axis camera can range between 120-185 degrees. In the embodiment of FIG. 3, a lens 334 has an optical coating that blocks infrared light, a f/1.8-16 aperture, a C-mount for a camera, and a horizontal and vertical field of view of 185 degrees. The axis cameras may be battery-powered, powered via cables and a cable interface (e.g. a USB interface), or some combination thereof.

The camera assembly 300 captures image information using the plurality of peripheral cameras 310 and axis cameras that are positioned to view 360 degrees of a local area. The settings of the camera assembly 300 can be previewed and modified remotely by a user. The image information can be sent to the data store 120 or to the processing server 140 to generate 3D-360 degree content.

Figure 4:
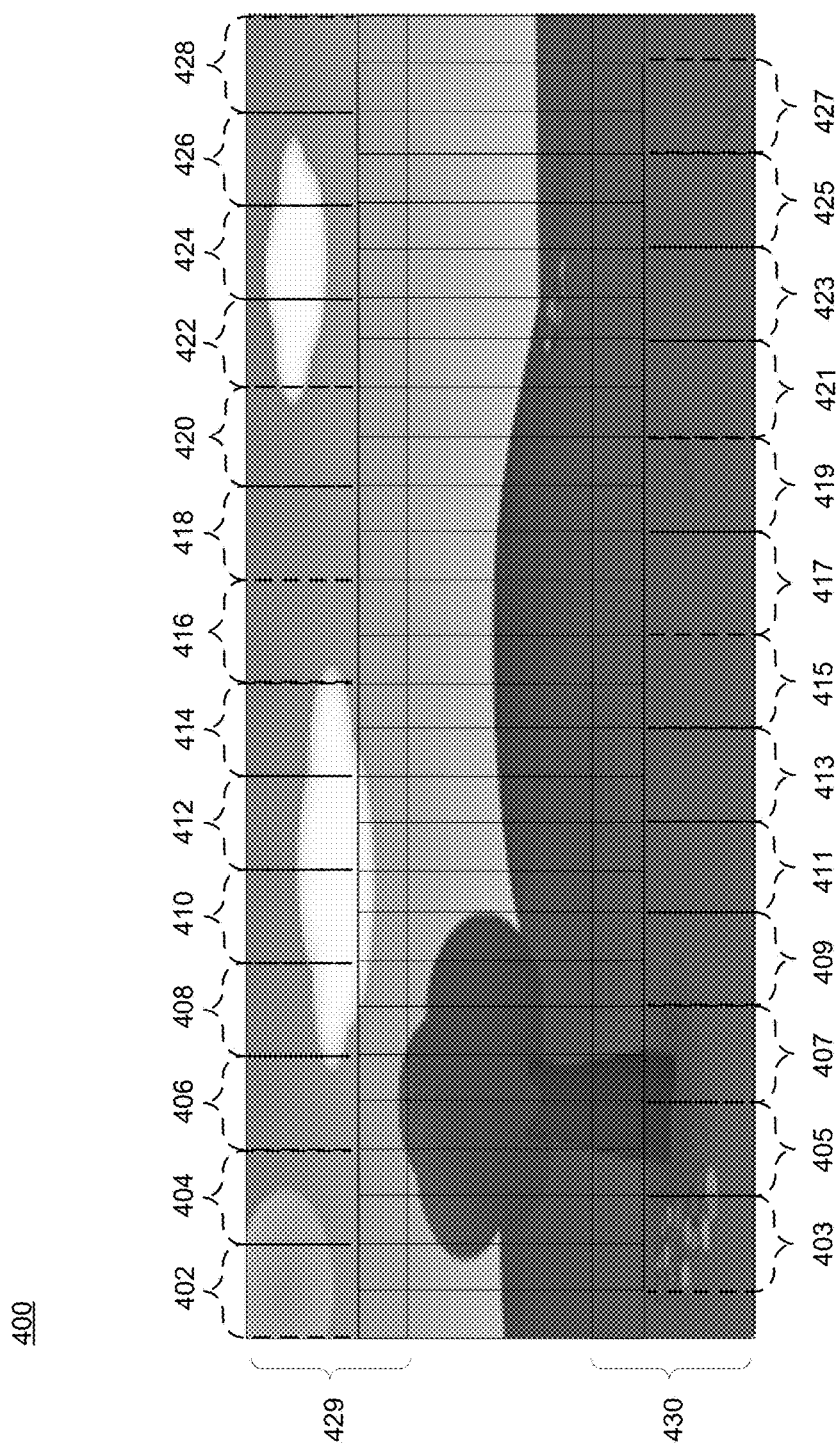
FIG. 4 illustrates 3D-360 degree content generated from high priority data stream, according to an embodiment.

FIG. 4 illustrates 3D-360 degree content generated from a high priority data stream, according to one embodiment. In the embodiment of FIG. 4, the 3D-360 degree content is a constructed image 400 that was generated using individual image frames 402-430. The individual image frames 402-430 were processed by the processing server 140 and constructed to form a 360 degree image that is in 3D for portions of the image generated from frames 402-430.

The frames 402-428 were captured by the plurality of peripheral cameras 310, wherein an individual frame is captured by one peripheral camera 310. Each frame 402-428 includes a two-dimensional (2D) portion of the local area. Combining images that capture a local area from multiple 2D perspectives into a single image allow the objects within the image to appear 3D. When individual frames captured by a camera assembly with a 360 degree view of a local area, such as frames 402-428, are combined, it results in the constructed image 400 that illustrates a 3D-360 degree view of the local area. Each frame 402-430 includes a region where it overlaps with respective adjacent frames, as illustrated in FIG. 4. The overlapping regions of the frames 402-428 result from the overlap of the fields of view of the peripheral cameras 310. The overlapping regions allow the processing server 140 to seamlessly and accurately construct the frames 402-428 into a 360 degree image for a virtual reality system.

Similarly, the frames 429 and 430 are captured by the plurality of axis cameras, wherein an individual frame is captured by one axis camera. In the embodiment of FIG. 4, frame 429 is captured by the top axis camera 312, and frame 430 is captured by the bottom axis camera. Each frame 429 and 430 includes a region where it overlaps with the frames 402-428 captured by the peripheral cameras 310, providing the top and bottom views of the local area. The overlapping regions of the frames 429 and 430 result from the overlap of the fields of view of the axis cameras with the peripheral cameras 310. The overlapping regions allow the processing server 140 to seamlessly and accurately combine the frames 429 and 430 with the frames 402-428 into a 360 degree image for a virtual reality system.

Furthermore, in the embodiment of FIG. 4, each frame 402-430 includes metadata that allows the processing server 140 to create the constructed image 400 from the individual frames 402-430. As described with regard to FIG. 1, metadata may include, e.g., frame rate, exposure setting (e.g., shutter speed, gain, etc.), copyright information, date/time information, camera identifier, names, labeling, some other information associated with the image information, or some combination thereof. For example, in one embodiment, to create the constructed image 400, the processing server 140 may use the date/time information for each frame to verify that the appropriate frames are combined. In another embodiment, the processing server 140 may use the camera identifier information to ensure that the frames are combined in the correct sequence. The metadata included with each frame 402-428 ensures that individual frames are combined correctly to create a 360 degree image for a virtual reality system.

Examples of Generating Live Preview

Figure 5A:
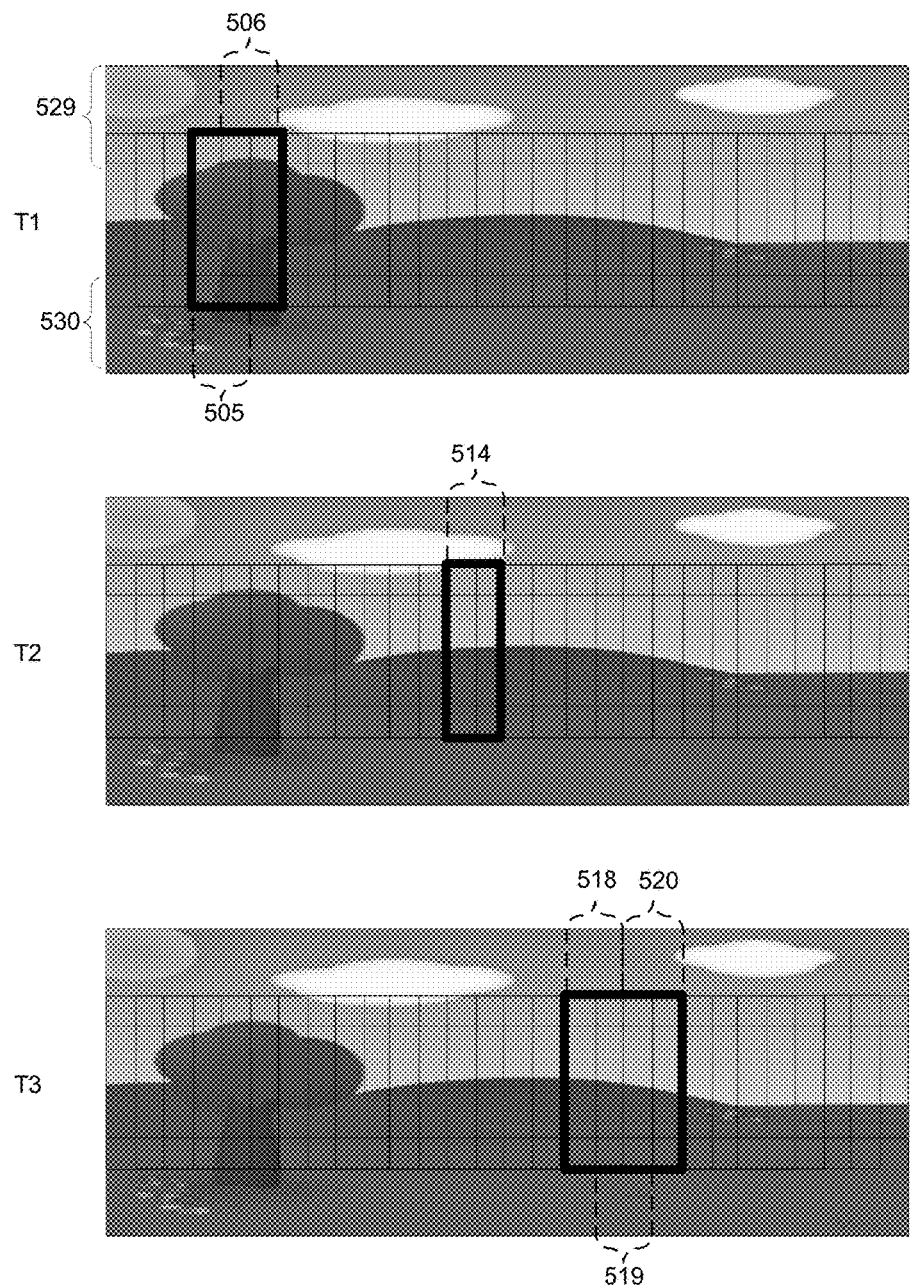
FIG. 5A illustrates selecting images during different time slots from a high priority data stream to generate a low priority data stream, according to an embodiment.

FIG. 5A illustrates selecting images during different time slots from a high priority data stream to generate a low priority data stream, according to an embodiment. The high priority data stream includes image information (e.g., RAW data) captured by the plurality of cameras. For simplicity and explanation purpose, as shown in FIG. 5A, the high priority data stream is represented as a stitched image. In practice, the high priority data stream is presented as individual images stored in memory locations. Each individual image corresponds to a corresponding camera of the plurality of cameras. For example, each memory location is associated with an identifier of each camera of the plurality of cameras. Each individual image associated with an identifier is stored in a memory location with the same identifier. The images are associated with a same time stamp. For example, at a time stamp, each camera of the plurality of cameras generates an image. All the images captured by all the cameras at the time stamp forms the high priority data stream. As shown in FIG. 5A, a given time period to generate a live preview includes three time slots. Each time slot ($T_1$, $T_2$, and $T_3$) corresponds to a high priority data stream associated with a time stamp. Different time slots correspond to different high priority data streams associated with different time stamps. During a first time slot $T_1$, the image extractor 270 selects images 505, 506, 529 and 530. During a second time slot $T_2$, the image extractor 270 selects image 514. During a third time slot $T_3$, the image extractor 270 selects images 518, 519, and 520. The image extractor 270 selects the images at different time slots based on the selecting rules. Due to low priority of selecting image frames to a live preview, an interval between $T_1$ and $T_2$ and an interval between $T_2$ and $T_3$ may be different. In this example, the interval between $T_1$ and $T_2$ results in that the selected image frames 505, 506, and 514 are not consecutive. The selected image frames (505, 506, 514, 518, 519, 520, 529, and 530) form the low priory data stream. The selected images are encoded and packetized to generate the live preview, as further descried in FIGS. 5B and 5C.

Figure 5B:
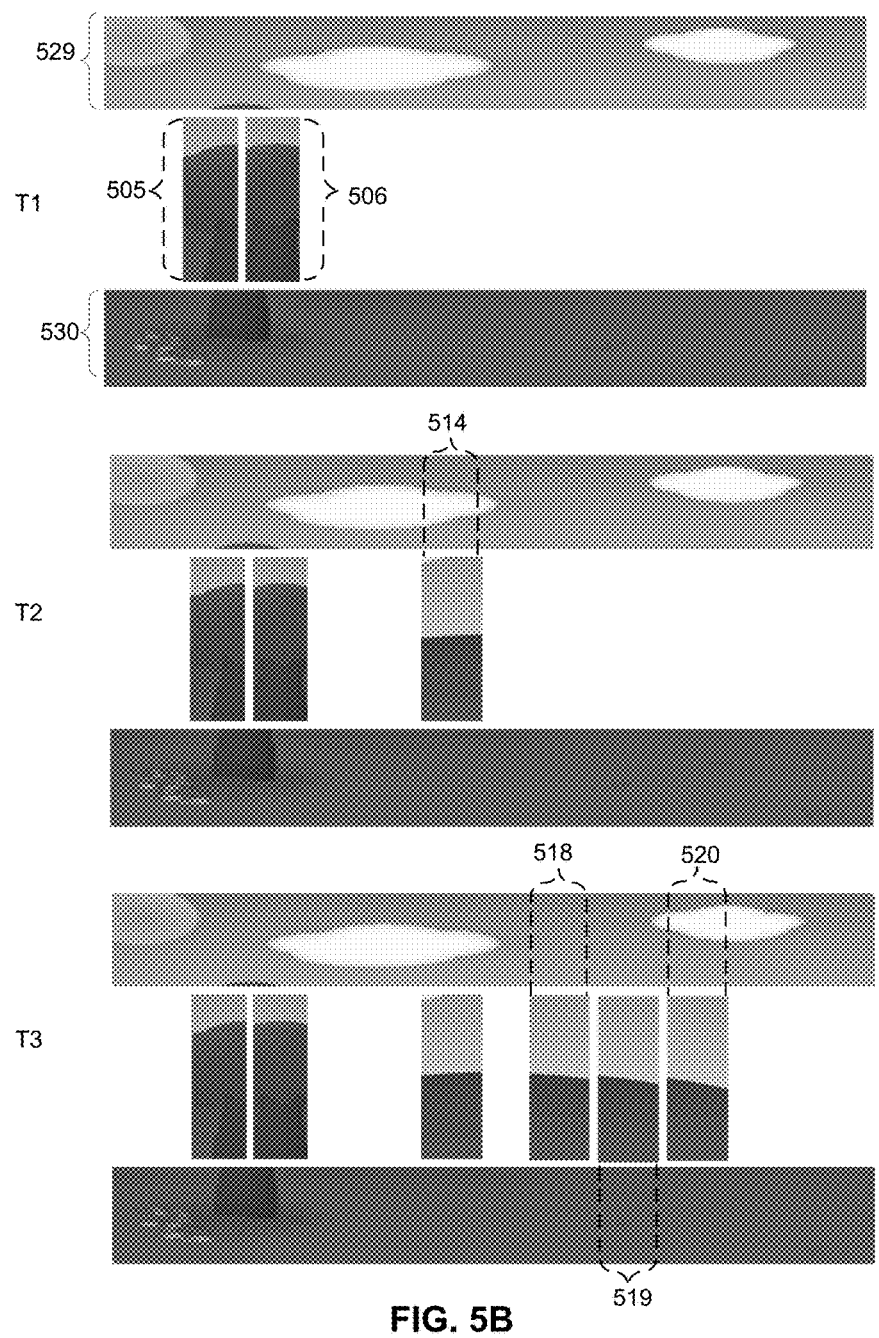
FIG. 5B illustrates selected images s as a part of a low priority data stream to generate a live preview, according to an embodiment.

FIG. 5B illustrates selected images s as a part of a low priority data stream to generate a live preview, according to an embodiment. As shown in FIG. 5B, the low priority data stream includes individual images selected from the high priority data stream during different time slots. During the time slot $T_1$, the low priority data stream includes individual images 505, 506, 529, and 530. For simplicity and explanation purpose, these individual images are represented separately at positions similar to the stitched image, e.g., the image 529 is placed on the top and the image 530 is placed on the bottom. Alternatively, all the selected images may be placed adjacent to each other. During the time slot $T_2$, the packertizer 280 combines the images (e.g., images 505, 506, 529, and 530) selected during the time slot $T_1$ with the new selected image 514 to generate a first combined set. During the time slot $T_3$, the packetizer 280 combines the first combined set (e.g., images 505, 506, 514, 529, and 530) with the new selected images 518-520 to generate a second combined set, and then the packetizer 280 packetizes the second combined set into packets to form a video feed for the live preview.

Figure 5C:
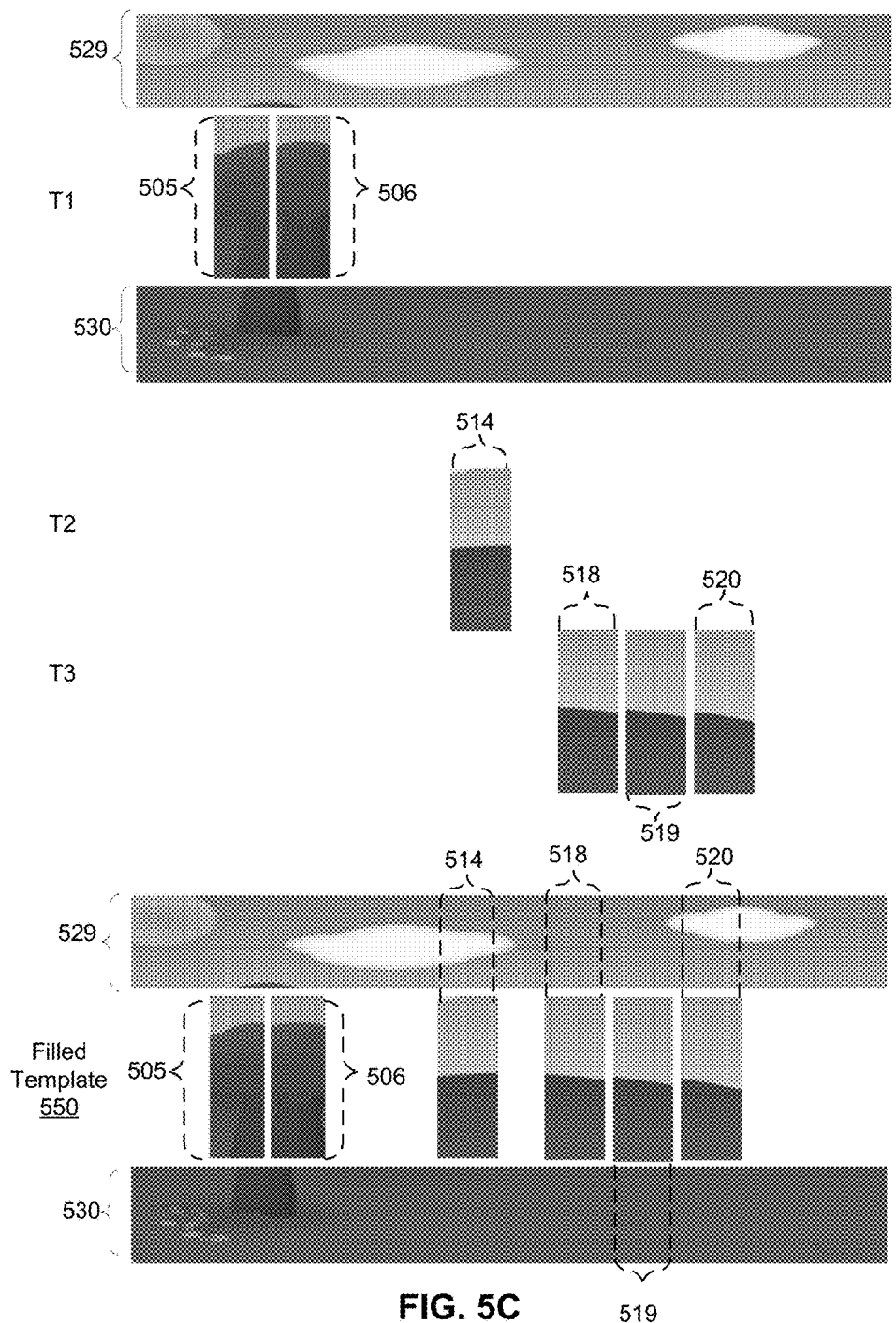
FIG. 5C illustrates images selected as part of a low priority data stream to generate a live preview, according to another embodiment.

FIG. 5C illustrates images selected as part of a low priority data stream to generate a live preview, according to another embodiment. As shown in FIG. 5C, the images (e.g., images 505, 506, 529, and 530), the image 514, and the images 518-520 are selected during the time slots $T_1$, $T_2$, and $T_3$, respectively. During each time slot, the packetizer packetizes the selected images into packets. The individual packetized images and the user interface 240 that includes an empty template and instructions are sent to the user device 110 via the network 105. The empty template labels each location with a corresponding identifier of the plurality of cameras. The user device 110 is instructed to fill the individual packetized images into corresponding labeled locations in the empty template. As shown in FIG. 5C, the individual packetized images (e.g., 505, 506, 514, 518, 519, 520, 529, and 530) are filled in the empty template to generate the filled template 550 as the live preview.

Figure 6:
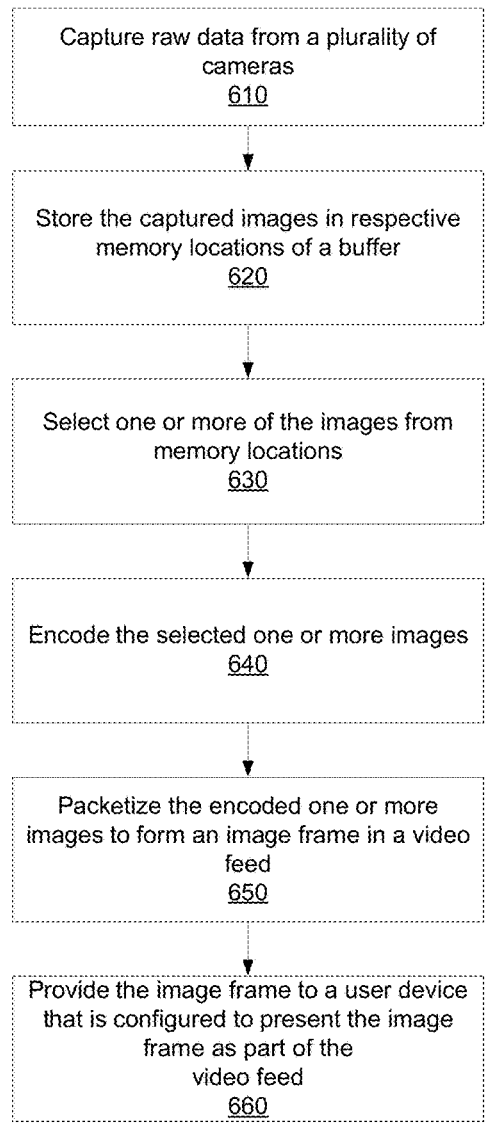
FIG. 6 is a flowchart of a process for determining a low priority data stream to generate a live preview in a camera assembly, according to an embodiment.

FIG. 6 is a flowchart of a process 600 for determining a low priority data stream to generate a live preview in a camera assembly, according to an embodiment. The camera assembly may be, e.g., the camera assembly 210. In other embodiments, the camera assembly may be some other camera assembly system that captures images that are stitched together to make an image with a larger field of view. The process 600 may be performed by the camera system 130 in some embodiments. Alternatively, other components may perform some or all of the steps of the process 600. Additionally, the process 600 may include different or additional steps than those described in conjunction with FIG. 6 in some embodiments or perform steps in different orders than the order described in conjunction with FIG. 6.

The camera system 130 captures 610 images from a plurality of cameras each having a respective field of view of a portion of a local area, and a combined field of view of the plurality of cameras spans 360 degrees of the local area. For example, the camera system 130 instructs (e.g., via the camera controller 250) instructs some of all the cameras (peripheral and/or axis cameras) in the camera assembly 210 to capture images via a global exposure setting and a global shutter. An example of the camera assembly 210 is described above with regard to FIG. 3.

The camera system 130 stores 620 the captured images in respective memory locations of a buffer. For example, the camera system 130 (via the camera controller 250) instructs one or more producers and consumers to store the captured images into respective memory locations of the data store 220. The memory locations are associated with a time stamp of a captured image and an identifier of the camera that captured the image, and the stored captured images form a high priority data stream that generates content associated with the portion of the local area. An example of the high priority data stream is described above with regard to FIG. 4.

The camera system 130 selects 630 one or more of the images from memory locations as part of a low priority data stream. The selecting process has a lower priority than operations associated with the higher priority data stream. The selected one or more images are associated with a same time stamp. For example, the live preview module 260 of the camera controller 250 selects one or more of the images from memory locations at one or more time slots to form the low priority data stream based on selecting rules. Examples of selecting one or more images to generate a live preview are described with regard to FIGS. 2, 5A through 5C.

The camera system 130 encodes 640 the selected one or more images. For example, the live preview module 260 of the camera controller 250 generates compressed image data by encoding image data and stores the compressed image data. The image data converted form image information (e.g., RAW data) has a format of a particular color space. An example of an encoder is described with regard to FIG. 2.

The camera system 130 packetizes 650 the encoded one or more images to form an image frame in a video feed. For example, the live preview module 260 of the camera controller 250 partitions encoded images into packets. In some embodiments, the packetizer 280 combines old encoded images selected during one or more previous time slots with new encoded images selected during current time slot. The packetizer 280 partitions the encoded images including old images selected during all previous time slots and new images selected during a final time slot into packets. In some embodiments, the packetizer 280 partitions encoded image selected during each time slot into packets. Examples are further described with regard to FIGS. 2, 5B and 5C.

The camera system 130 provides 660 the image frame to a user device that is configured to present the image frame as part of the video feed. For example, the camera system 130 provides the image frame to the user interface 240 and the user interface 240 presents the image frame to one or more user devices 110 via the web-enabled browser 150, or some other client application included in the user device 110. In another example, the camera system 130 provides individual image frames and the user interface 240 including an empty template and instructions to the user device 110. The user device 110 is instructed to fill the individual image frames into the empty template to generate a filled template to generate the live preview. A user of the user device 110 may control the camera system 130 based on the live preview. For example, the user of the user device 110 may select one or more identifiers associated with the plurality of cameras via the user interface 240 to generate the live preview. The camera controller 250 selects corresponding images associated with the selected identifiers to generate the live preview. Additionally and/or alternatively, the user of the user device 110 may select how many images during each time slot via the user interface 240 through the web-enabled browser 150 included in the user devices 110. An example of a user interface is described below with regard to FIG. 7.

Example User Interface for Live Preview

Figure 7:
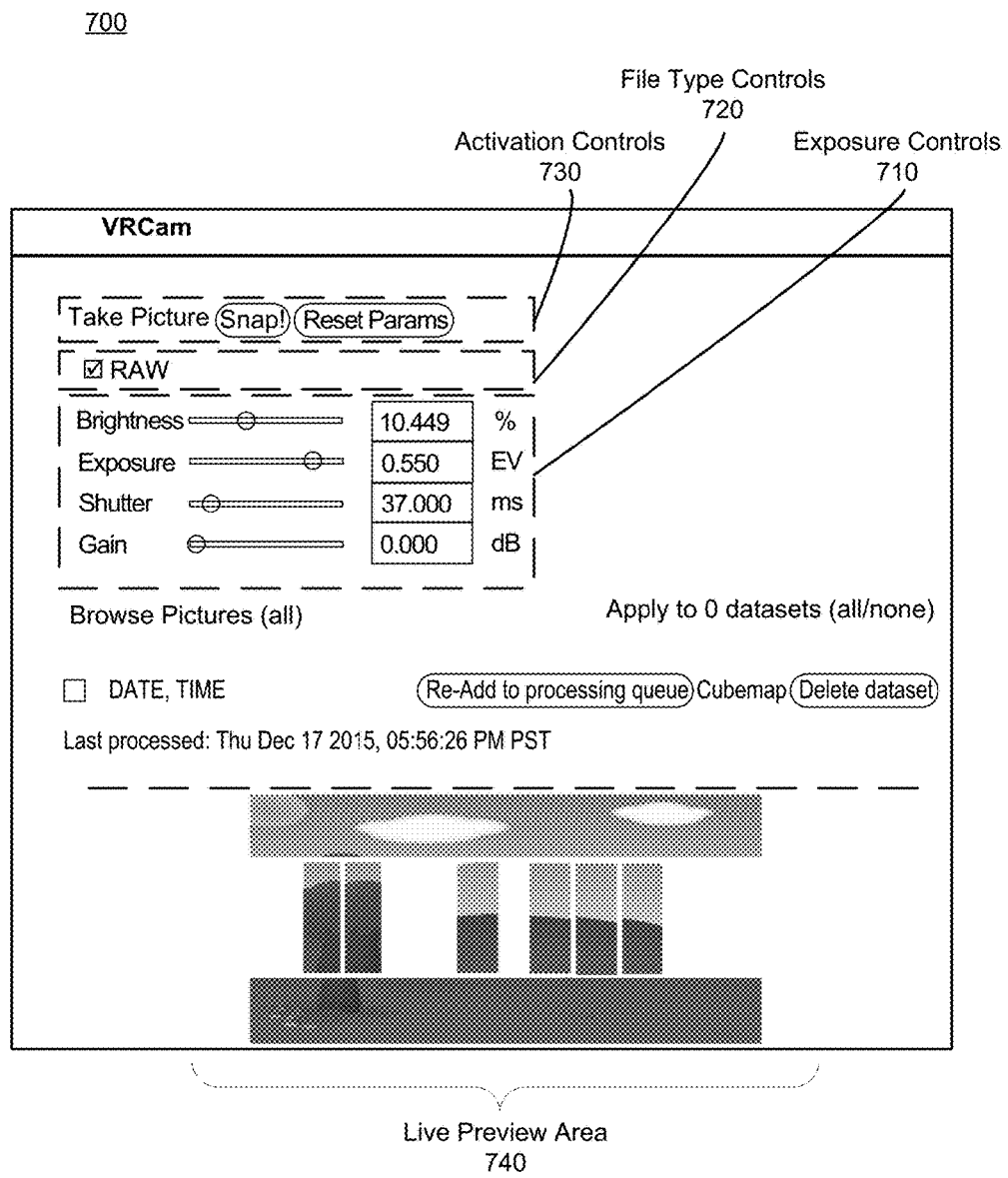
FIG. 7 illustrates a user interface with a live preview for a camera system, according to an embodiment.

FIG. 7 illustrates a user interface 700 with live preview for the camera system 130, according to one embodiment. The user interface 700 may be, e.g., the user interface 240. The user interface 700 allows a user to control the camera system 130. The user interface 700 includes exposure controls 710, file type controls 720, activation controls 730, and a live preview area 740.

The exposure controls 710 allow a user to control and adjust the global exposure setting of the camera assembly 210. The exposure controls 710 may include brightness, aperture, shutter, and gain settings. The global exposure setting is determined from all of the cameras in the camera assembly 210. In some embodiments, the global exposure setting may be determined from a principal camera in the camera assembly 210. The determined settings may serve as initial settings, from which the user can adjust using the exposure controls 710. Once the exposure controls 710 have been adjusted to the desired settings, the desired settings can be provided to each camera in the camera assembly 210.

The file type controls 720 allow a user to control the format in which image information is captured. The file type controls 720 may include various file types for images (e.g. .jpeg, .tif, .png, etc.), audio (e.g. .aac, .mp3, .wav, etc.), and/or video (e.g. .mpg, .mov, .wmv, etc.). Some embodiments may allow a user to control the file type for each individual type of image information.

The activation controls 730 allow a user to control the operation of the camera assembly 210. The activation controls 730 may include, but are not limited to, options to power the camera assembly 210 on and off, to activate the camera assembly 210 to capture image information, to reset the settings of the camera assembly 210, to activate the processing server 140 to start or stop processing the captured image information, among other functionalities for the camera system 130.

The live preview area 740 allows a user to live preview images captured by at least one of the cameras of the camera assembly 210 with pseudo-real time. The preview area 740 may presents the images separately (e.g., the images are adjacent to each other), or presents the images in a template (as shown in FIG. 5C). The live preview area 740 assists the user in determining desired exposure setting of the camera assembly 210 and/or desired positioning of the camera assembly 210 within the local area with pseudo-real time. The user can also select desired cameras and the number of image frames to generate the live preview. The live preview area 740 ensures that the camera assembly 210 is capturing image information to construct desired 3D-360 degree content for a virtual reality system.

In some embodiments, the user interface 240 also allows a user to control the processing server 140, access the data store 120, and access the data store 220. In the embodiment of FIG. 7, the user interface 240 includes settings (e.g. brightness, exposure value defined by the aperture and shutter speed, shutter, and gain), an image preview, and metadata associated with the image preview. The settings may be modified by the user, and the settings are sent to the camera controller 250, which commands the camera assembly 210 and implements the camera settings globally onto the peripheral cameras 310 and axis cameras. The user interface 240 may be accessed on any device that has a network connection to the network 105.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    capturing images from a plurality of cameras each having a respective field of view of a portion of a local area, and a combined field of view of the plurality of cameras spans 360 degrees of the local area;
    storing the captured images in respective memory locations of a buffer, wherein the memory locations are associated with a time stamp of a captured image and an identifier of the camera that captured the image, and the stored captured images form a high priority data stream that generates content associated with the portion of the local area;
    selecting, as part of a low priority data stream, one or more of the images from memory locations, wherein the selecting has a lower priority than operations associated with the higher priority data stream, the selected one or more images are associated with a same time stamp;
    encoding the selected one or more images;
    packetizing the encoded selected one or more images to form an image frame in a video feed; and
    providing the image frame to a user device that is configured to present the image frame as part of the video feed.

2. The method of claim 1, wherein selecting as part of the low priority data stream, one or more of the images from memory locations comprises selecting one or more of the images from memory locations at different time slots.

3. The method of claim 2, wherein the different time slots include a first time slot, a second time slot, and a third time slot, and an interval between the first time slot and the second time slot is different than an interval between the second time slot and the third time slot.

4. The method of claim 1, wherein selecting as part of the low priority data stream, one or more of the images from memory locations is based on one or more selecting rules that determine how to select the one or more images.

5. The method of claim 4, wherein the one or more selecting rules are selected from a group consisting of: selecting images from one or more selected cameras of the plurality of cameras, selecting how many images from each time slot, or selecting images based on a priority rule that determines priority ranking of operations of each camera.

6. The method of claim 5, wherein the priority ranking is based in part on priority weight of each camera.

7. The method of claim 6, wherein the plurality of cameras comprises a plurality of peripheral cameras and a plurality of axial cameras, one or more of the plurality of peripheral cameras are weighted higher than the plurality of axial cameras.

8. The method of claim 5, wherein the priority ranking is based in part on an input from a user of the user device.

9. The method of claim 1, wherein packetizing the encoded one or more images to form an image frame in the video feed comprises:
    combining encoded images selected during a first time slot with the encoded images selected during a second time slot to generate a first combined set; and
    partitioning the first combined set into packets.

10. The method of claim 2, wherein packetizing the encoded one or more images to form an image frame in a video feed comprises:
    partitioning the encoded images selected during each time slot to form individual image frames corresponding to each time slot; and
    providing the individual image frames to the user device to generate the video feed.

11. The method of claim 10, wherein providing the individual image frames to the user device to generate the video feed comprises providing a user interface including an empty template and instructions to the user device, wherein the empty template labels each location in the template with a corresponding identifier of the plurality of cameras, wherein the instructions comprise commands that instruct the user device to fill the individual image frames into the empty template based on identifiers of the plurality of cameras.

12. A system comprising:
    a camera assembly configured to capture images, the camera assembly comprising a plurality of cameras each having a respective field of view of a portion of a local area, and a combined field of view of the plurality of cameras spans 360 degrees of the local area;
    a data store configured to store the captured images in respective memory locations of a buffer, wherein the memory locations are associated with a time stamp of a captured image and an identifier of the camera that captured the image, and wherein the stored captured images form a high priority data stream that generates content associated with the portion of the local area;

an image extractor configured to select, as part of a low priority data stream, one or more of the images from memory locations, wherein the selecting has a lower priority than operations associated with the higher priority data stream, the selected one or more images are associated with a same time stamp;

an encoder configured to encode the selected one or more images;

a packetizer configured to packetize the encoded selected one or more images to form an image frame in a video feed; and a user interface configured to provide the image frame to a user device that is configured to present the image frame as part of the video feed.

13. The system of claim 12, wherein the image extractor is further configured to select one or more of the images from memory locations at different time slots.

14. The system of claim 13, wherein the different time slots include a first time slot, a second time slot, and a third time slot, and an interval between the first time slot and the second time slot is different than an interval between the second time slot and the third time slot.

15. The system of claim 12, wherein the image extractor is further configured to, select, as part of a low priority data stream, one or more of the images from memory locations, based on one or more selecting rules that determine how to select the one or more images.

16. The system of claim 15, wherein the one or more selecting rules are selected from a group consisting of: selecting images from one or more selected cameras of the plurality of cameras, selecting how many images from each time slot, or selecting images based on a priority rule that determines priority ranking of operations of each camera.

17. The system of claim 16, wherein the priority ranking is based in part on priority weight of each camera.

18. The system of claim 17, wherein the camera assembly comprises a plurality of peripheral cameras and a plurality of axial cameras, one or more of the plurality of peripheral cameras are weighted higher than the plurality of axial cameras.

19. The system of claim 16, wherein the priority ranking is based in part on an input from a user of the user device.

20. The system of claim 12, wherein the packetizer is further configured to:

combine encoded images selected during a first time slot with the encoded images selected during a second time slot to generate a first combined set; and partition the first combined set into packets.

21. The system of claim 13, wherein the packetizer is further configured to:

partition the encoded images selected during each time slot to form individual image frames corresponding to each time slot; and provide the individual image frames to the user device to generate the video feed.

22. The system of claim 21, wherein providing the individual image frames to the user device to generate the video feed comprises providing a user interface including an empty template and instructions to the user device, wherein the empty template labels each location in the template with a corresponding identifier of the plurality of cameras, the instructions comprise commands that instruct the user device to fill the individual image frames into the empty template based on identifiers of the plurality of cameras.

* * * * *